(12) United States Patent
Cognolato et al.

(10) Patent No.: US 9,897,147 B2
(45) Date of Patent: Feb. 20, 2018

(54) BEARING SEAL AND USE THEREOF

(71) Applicants: Gianni Cognolato, Moncalieri (IT); Nora Li, Shanghai (CN); Monica Chen, Shanghai (CN); Zongbin Wu, Shanghai (CN)

(72) Inventors: Gianni Cognolato, Moncalieri (IT); Nora Li, Shanghai (CN); Monica Chen, Shanghai (CN); Zongbin Wu, Shanghai (CN)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/165,766

(22) Filed: May 26, 2016

(65) Prior Publication Data
US 2016/0348726 A1    Dec. 1, 2016

(30) Foreign Application Priority Data
May 29, 2015   (CN) .......................... 2015 1 0289438

(51) Int. Cl.
*F16C 33/76*   (2006.01)
*F16C 33/78*   (2006.01)
*F16C 19/06*   (2006.01)
*F16C 27/06*   (2006.01)

(52) U.S. Cl.
CPC ...... *F16C 33/7883* (2013.01); *F16C 33/7823* (2013.01); *F16C 19/06* (2013.01); *F16C 27/066* (2013.01); *F16C 2326/06* (2013.01)

(58) Field of Classification Search
CPC ................ F16C 27/066; F16C 33/6618; F16C 33/6655; F16C 33/7823; F16C 33/7879; F16C 33/7883
See application file for complete search history.

(56) References Cited

U.S. PATENT DOCUMENTS

2003/0198415 A1* 10/2003 Miyagawa .............. F16C 19/06
                                                                    384/450

FOREIGN PATENT DOCUMENTS

| FR | 2918135 A1 | * | 1/2009 | .......... F16C 33/6618 |
| JP | 2001193748 A | * | 7/2001 | .......... F16C 33/6618 |
| JP | 2006132707 A | * | 5/2006 | .......... F16C 33/6618 |
| WO | WO 2014065013 A1 | * | 5/2014 | ............ F16J 15/164 |

* cited by examiner

*Primary Examiner* — Phillip A Johnson
(74) *Attorney, Agent, or Firm* — Bryan Peckjian; SKF USA Inc. Patent Dept.

(57) ABSTRACT

A bearing seal is provided having inner and outer frames capable of forming a tight fit with a bearing inner ring and with a bearing outer ring respectively. The frames adjacent to each other, at least one of the two formed with an axial lip abutting an inner surface of the other in an axial direction and a radial lip abutting an inner surface of the other in a radial direction, for sealing an axial gap and a radial gap. A flexible convolute structure formed on the radial lip, and the convolute structure is initially formed with at least two hinge points. The hinge points are points of connection and intersection between adjacent bend surfaces in the convolute structure, being the locations of the principal regions where the material actually deforms by bending between adjacent bend surfaces. Predetermined bend angles are formed at the hinge points between adjacent bend surfaces.

9 Claims, 2 Drawing Sheets

US 9,897,147 B2

BEARING SEAL AND USE THEREOF

CROSS-REFERENCE TO RELATED APPLICATIONS

This application claims priority to Chinese patent application no. 201510289438.0 filed on May 29, 2015, the contents of which are fully incorporated herein by reference.

TECHNICAL FIELD

The present invention relates to a bearing seal, a roller bearing of conventional type employing the seal, and a central support bearing unit in a vehicle rear wheel drive system.

BACKGROUND ART

In the lorry rear wheel drive system shown in FIGS. 1 and 2, a central support bearing unit 100 is fixed beneath the vehicle body by means of a fastening means (not shown), to provide radial support for a drive shaft (propeller shaft) 200. In the lorry rear wheel drive system, the drive shaft 200 has a high rotation speed, up to 2,500 rpm. To accommodate such a high rotation speed, the central support bearing unit 100 conventionally employs a deep groove ball bearing. FIG. 3 shows a partial sectional schematic diagram of a deep groove ball bearing and a conventional seal thereof. In practice, the deep groove ball bearing in the assembly has a very high failure rate, because it is difficult for the seal thereof to block the ingress of external contaminants, and this readily causes premature failure of the bearing.

To solve this problem, the applicant once tried using the sealing scheme shown in FIG. 4. This is a cassette seal used for a vehicle wheel hub bearing, providing an inner frame (flinger or inner stamping) 2 and an outer frame (outer stamping) 4 which are adjacent to each other after installation. After assembly, the inner frame 2 forms a tight fit with an outer surface of a bearing inner ring, while the outer frame 4 forms a tight fit with an inner surface of a bearing outer ring. A sealing body 5, which helps to prevent lubricant from leaking out of the bearing interior via the inner surface of the bearing outer ring, is formed on the outer frame 4. The sealing body 5 extends towards the inner frame 2 to form an axial lip 7 and a radial lip 9 in elastic contact with the inner surface of the inner frame, for sealing an axial gap and a radial gap, respectively, between the inner frame 2 and the outer frame 4. The radial lip 9 is further provided with a garter spring 3 around a peripheral neck thereof, for providing an additional radial constraining force for the radial lip 9. In a typical situation, the garter spring 3 is a coil spring with its two ends connected together, which can provide an additional binding force for the radial lip in a contracted state. Although such a cassette seal for a vehicle wheel hub bearing has good sealing performance, it can hardly accommodate a lorry rear wheel drive system, which demands higher rotation speeds. Experiments have demonstrated that even if the garter spring 3 is removed, to eliminate the constricting action thereof on the radial lip 9, the friction effect between the radial lip 9 and the inner frame 2 is still significant, and temperature rise experiments can still hardly meet the standard requirements. Too high a temperature rise is highly likely to cause premature failure of the bearing and seal, so that the vehicle's technical requirements for the central support bearing unit cannot be met. The industry awaits a bearing seal that can meet higher rotation speeds, and which has a low temperature rise and a reliable sealing effect.

SUMMARY OF THE INVENTION

To solve the above problem, the present invention provides a bearing seal, providing an inner frame capable of forming a tight fit with a bearing inner ring and an outer frame capable of forming a tight fit with a bearing outer ring after assembly. After assembly, the inner frame and outer frame are adjacent to each other, but not in contact with each other, at least one of the two is formed with an axial lip abutting an inner surface of the other substantially in an axial direction and a radial lip abutting an inner surface of the other substantially in a radial direction, for sealing an axial gap and a radial gap, respectively, between the inner frame and outer frame. A flexible convolute structure is formed on the radial lip, and in a natural unrestricted state before assembly, the convolute structure is initially formed with at least two bent hinge points. The hinge points are points of connection and intersection between adjacent bend surfaces in the convolute structure, being the locations of the principal regions where the material actually deforms by bending between adjacent bend surfaces, and predetermined bend angles are formed at the hinge points between adjacent bend surfaces.

The flexible convolute structure not only helps to maintain elastic contact between the radial lip and the inner frame, preventing leakage of lubricant from the bearing interior, but can also effectively reduce the frictional torque and contact pressure between the radial lip and the inner frame and fundamentally reduce the temperature rise effect of the bearing and seal at high rotation speeds, to completely solve the problem of sealing the bearing in an central support bearing unit under the above operating conditions.

Preferred embodiments and beneficial effects of the present invention are described in detail below with reference to the accompanying drawings.

DETAILED DESCRIPTION OF THE INVENTION

Figure 5:
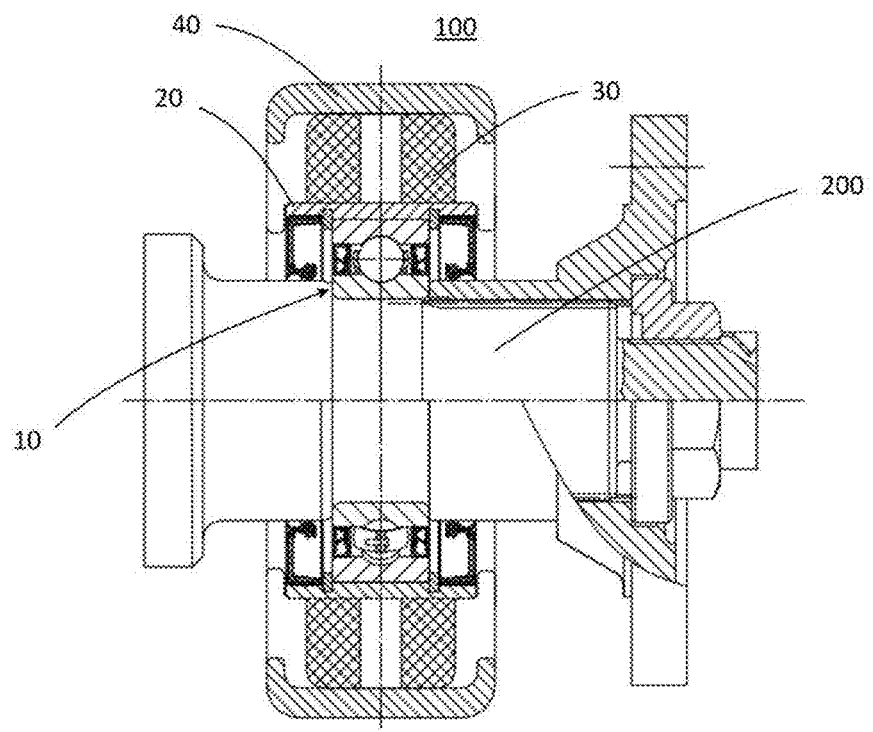
FIG. 5 is a longitudinal sectional schematic diagram of the central support bearing unit of the present invention in an assembled state.

FIG. 5 is a sectional schematic diagram of the central support bearing unit of the present invention in an assembled state, as viewed from one side. In the bearing assembly 100 shown in the figure, a roller bearing 10 is fitted in a bearing housing 20. The bearing housing 20 is fixed in a framework 40 by means of a shock-absorbing material 30 such as rubber; the framework fixes the bearing assembly 100 reliably beneath a lorry body via a fastening means (not shown).

Figure 6:
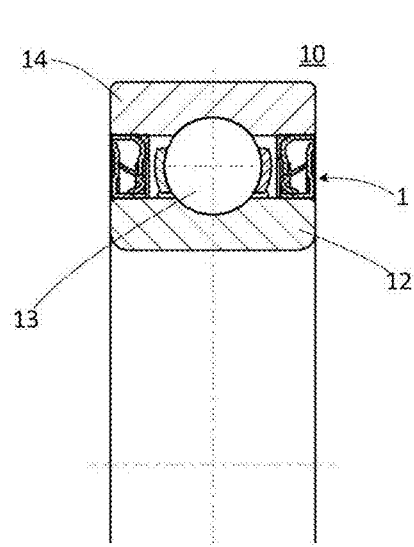
FIG. 6 is a partial sectional schematic diagram of a deep groove ball bearing employing the bearing seal of the present invention.

In a typical situation, the roller bearing 10 is a deep groove ball bearing. FIG. 6 is a partial sectional schematic diagram of a deep groove ball bearing employing the seal of the present invention. It can be seen from the figure that the bearing 10 provides an inner ring 12 and an outer ring 14 distributed in sequence from inside to outside in a radial direction, as well as at least one row of roller bodies 13 disposed between the inner ring 12 and outer ring 14. The roller bodies 13 can run reliably between the inner ring 12 and outer ring 14. The bearing seal 1 of the present invention is disposed on two sides of the bearing 10, in the width direction between the inner and outer rings thereof.

Figure 1:
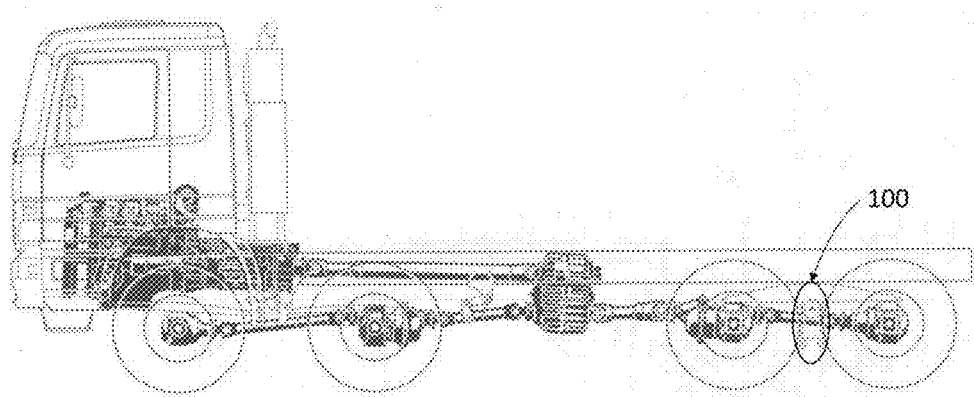
FIG. 1 is a structural schematic diagram of a lorry rear wheel drive system as viewed from one side.
Figure 2:
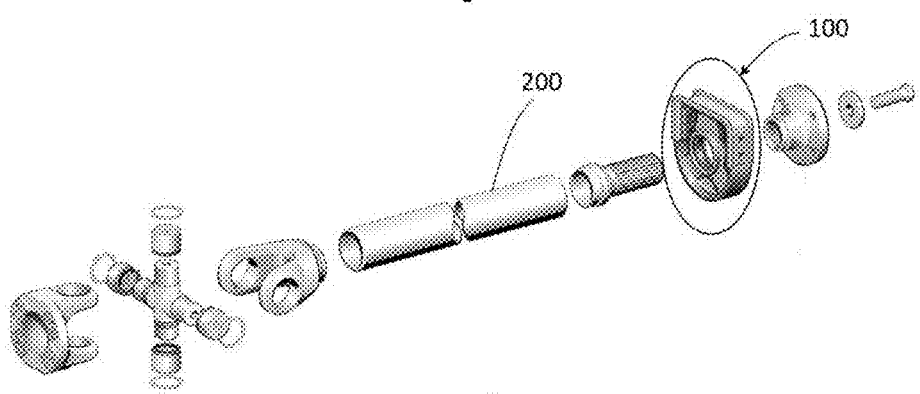
FIG. 2 is three-dimensional schematic assembly diagram of a central support bearing unit and components lying upstream/downstream thereof.
Figure 3:
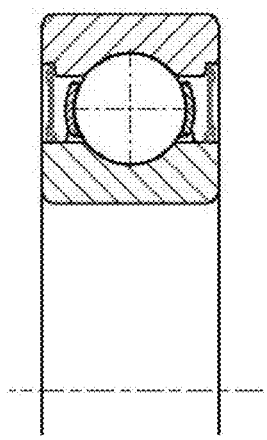
FIG. 3 is a partial sectional schematic diagram of a deep groove ball bearing with a conventional seal.
Figure 4:
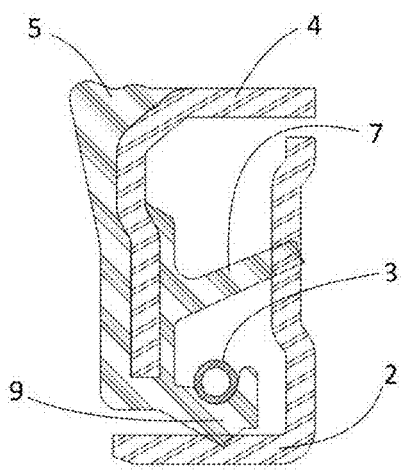
FIG. 4 is an enlarged sectional schematic diagram of a cassette seal used in a vehicle wheel hub bearing.
Figure 7:
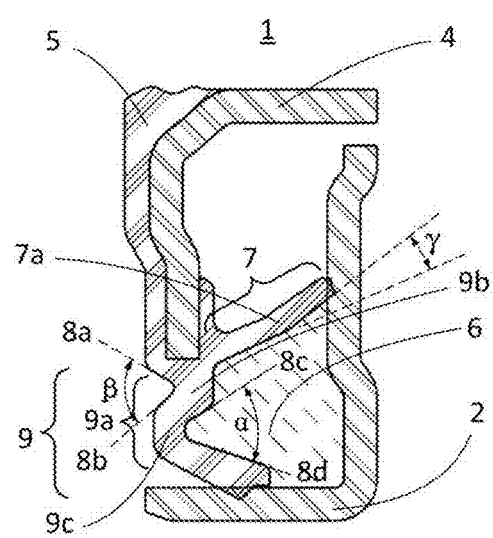
FIG. 7 is an enlarged sectional schematic diagram of the bearing seal of the present invention.

FIG. 7 is a partial enlarged sectional drawing of the bearing seal of the present invention. The seal 1 shown in the figure is also a cassette seal, roughly similar to the cassette seal shown in FIG. 4; both comprise an inner frame 2 capable of forming a tight fit with the inner ring 12 of the bearing and an outer frame 4 capable of forming a tight fit with the outer ring 14 of the bearing after assembly. A sealing body 5, for preventing lubricant from leaking out of the interior of the bearing 10 via an inner surface of the outer ring 14, is formed on the outer frame 4. The sealing body 5 continues to extend towards the inner frame 2, to form an axial lip 7 that contacts an inner surface of the inner frame 2 substantially in an axial direction, and a radial lip 9 that contacts an inner surface of the inner frame 2 substantially in a radial direction, for sealing an axial gap and a radial gap, respectively, between the inner frame 2 and the outer frame 4. The axial lip 7 is used to prevent external contaminants from entering the interior of the bearing 10 and the seal 1, while the radial lip 9 is used to prevent lubricant from leaking out of the bearing interior through the seal 1.

It can also be seen from FIG. 7 that the axial lip 7, radial lip 9 and inner surface of the inner frame 2 together define an airtight space 6, which is used to store lubricant needed to lubricate the axial lip 7 and radial lip 9. The arrangement of the airtight space helps to reduce friction between the axial lip 7 and the inner frame 2, and between the radial lip 9 and the inner frame 2. Incidentally, the choice of lip lubricant is related to the material of the lip, and may be different from the lubricant used to lubricate the rolling components inside the bearing, both in type and properties.

In terms of function, the sealing body 5 mainly provides static sealing, for preventing lubricant from leaking out of the bearing 10 via the inner surface of the outer ring 14 when the bearing outer race 14 experiences oblique perturbation (runs non-coaxially with respect to the inner ring 12). Similarly, when the bearing inner ring 12 experiences oblique perturbation (runs non-coaxially with respect to the outer ring 14), the sealing body 5 should be disposed on the inner frame 2, to prevent lubricant from leaking out of the interior of the bearing 10 via an outer surface of the inner ring 12. It will be readily appreciated that in a case where both the bearing inner ring and outer ring might experience oblique perturbation, sealing bodies 5 should be disposed on both the inner frame 2 and the outer frame 4, to prevent lubricant from leaking out of the interior of the bearing 10 via an inner surface of either one of the inner ring and outer ring. In practice, although the last arrangement can prevent leakage of grease from the interior of the bearing more comprehensively, it will also considerably increase the cost of manufacturing the seal, therefore an appropriate choice should be made according to the requirements of the operating conditions and the cost requirements. In the embodiment shown in FIG. 7, the sealing body 5 and the lips 7 and 9 extending therefrom are only formed on the outer frame 4 for the following reason too. In the bearing assembly 100 shown in FIG. 5, the outer ring 14 is fixed in the bearing housing 20, whereas the inner ring 12 rotates together with a drive shaft 200. If the sealing body 5 and lips 7 and 9 were to be disposed on the inner frame 2, the inevitable consequence would be that they would rotate together with the inner ring 12 and drive shaft 200. Centrifugal force caused by high-speed rotation would thus very probably change the extension attitude of the lips 7 and 9, affecting the stability and likelihood of the lips 7 and 9 touching the inner surface of the inner frame 2, and hence causing temporary or even permanent failure of sealing. Of course, in other application scenarios, for example one in which the bearing inner ring is fixed and the outer ring rotates, the sealing body and lips should be disposed on the inner frame rather than the outer frame; the reasoning is the same, and will not be repeated here.

It must be pointed out that in the particular embodiment shown in FIG. 7, the sealing lips 7 and 9 are formed integrally with the sealing body 5, as part of the sealing body 5. Both are formed of the same material, e.g. both may use ordinary rubber or low friction rubber. This helps to reduce the number of components and the types of moulds, thereby simplifying the process and lowering costs. Of course, if the sealing lips need to be of a different material from the sealing body, e.g. the sealing body is of ordinary rubber while the sealing lips are of polytetrafluoroethylene (PTFE), it is also an option to arrange the sealing lips on the inner frame and/or outer frame independently of the sealing body.

As FIG. 7 shows, a flexible convolute structure 9a is also formed on the radial lip 9 in a radial direction. In a natural unrestricted state before assembly, the convolute structure 9a initially forms a cross section that is substantially shaped like a folded fan or a wave, and has two or more hinge points 9b and 9c, to enable the radial lip 9 to deform elastically. The hinge points are defined in the present invention as points of connection and intersection between adjacent bend surfaces (8a and 8b; 8c and 8d), and are the locations of the principal regions where the material actually deforms by bending. In the unrestricted natural state before assembly, the bend surfaces may be straight or curved surfaces, and form a certain bend angle at the hinge point therebetween. In FIG. 7, the bend angle $\alpha$ between bend surfaces 8c and 8d may be the same as or different from the bend angle $\beta$ between 8a and 8b. In a typical situation, the angular range of bend angle $\alpha$ should be 35-60 degrees, while the angular range of bend angle $\beta$ should be 60-90 degrees.

It must be pointed out that the flexible convolute structure 9a is different from the flexural deformation of conventional lips. The flexural deformation of conventional lips is often caused by the lips being subjected to external pressure after actual assembly; in a natural unrestricted state, the lips themselves generally are not formed with an initial bend, or even if they are, the angle of bend thereof is not notable. In the embodiment shown in FIG. 7, the cross section of the flexible convolute structure 9a is substantially N-shaped or Z-shaped, i.e. has two bent hinge points 9b and 9c. In fact, having more than two hinge points, e.g. making the cross section M-shaped or W-shaped, can also achieve the object of the present invention.

The flexible convolute structure 9a not only gives the radial lip 9 sufficient extension/retraction elasticity, allowing the seal 1 to follow the variation in radial separation of the inner and outer rings at the right time in a state where the bearing's inner and outer rings are not coaxial (i.e. experience deflection), but also have the following two advantages: 1. the flexible convolute structure 9a can significantly reduce the contact pressure between the radial lip 9 and the inner frame 2 and the frictional resistance arising therefrom, thereby effectively reducing the temperature rise effect which arises during operation of the bearing 10 and seal 1; 2. the convolute structure 9a also enables the radial lip 9 to maintain a substantially constant contact pressure with the inner frame 2 over a relatively large range of extension/retraction, ensuring that the frictional temperature rise of the lip 9 is kept stable and controllable.

As FIG. 7 shows, in a natural unrestricted state, the dimension by which the radial lip 9 exceeds the inner surface of the inner frame 2 in the radial direction is defined in the present invention as the radial interference amount of the radial lip 9. This interference amount actually determines the extent of deformation by contraction of the radial lip 9 in the radial direction after installation. The function of the flexible convolute structure 9a is to make the pressure with which the radial lip 9 contacts the inner surface of the inner frame 2 insensitive to the radial interference amount of the radial lip 9, so as to lower the requirement for the design precision of the radial lip 9, and allow the latter to employ a larger tolerance band design, and thereby effectively reduce production costs.

Similarly, the axial lip 7 shown in FIG. 7 is likewise in an initial state before assembly in which it is not restricted by the inner frame 2. In a natural unrestricted state, the dimension by which the axial lip 7 exceeds the inner surface of the inner frame 2 in the radial direction is defined in the present invention as the axial interference amount of the axial lip 7. This interference amount determines the extent of deformation by contraction of the axial lip 7 in the axial direction after installation. To ensure that the axial lip 7 can touch the inner surface of the inner frame 2 with the minimum contact stress in order to reduce heat generation by friction, the axial lip 7 must contact the inner surface of the inner frame 2 with the minimum axial interference amount needed to make up for a dimensional shortfall that might be caused by a tolerance band (including dimensional tolerance and assembly tolerance). In other words, it must first be ensured that the axial lip 7 can reliably touch the inner surface of the inner frame 2, overcoming the problem of dimensional insufficiency for axial mating of the axial lip 7 and inner frame 2 which might by caused by the tolerance band. However, the axial interference amount by which the axial lip 7 exceeds the inner surface of the inner frame 2 should be as small as possible, to ensure that the axial lip 7 can touch the inner surface of the inner frame 2 with the minimum contact stress. This matching relationship can be expressed using the following mathematical relation: suppose that the nominal design value of the axial interference amount of the axial lip 7 is $\Delta X$, and the design range of the tolerance band of the axial lip 7 and inner frame 2 in the axial direction (including the dimensional tolerance and assembly tolerance of the two) is between $\pm\sigma$, then $\Delta X \geq \sigma$. The object of the above design is to reduce as far as possible the axial interference dimension by which the axial lip 7 exceeds the inner surface of the inner frame 2, reduce friction therebetween to the maximum extent, and thereby effectively reduce the temperature rise. Under critical conditions, $\Delta X$ is just right to make up the dimensional shortfall for mating between the axial lip 7 and the inner frame 2 caused by the tolerance, and the axial lip 7 and inner surface of the inner frame 2 form "formal contact". Theoretically, the term "formal contact" means that zero-separation contact is achieved between two objects, but this will not cause any force action therebetween. This is the minimum requirement to ensure that the axial lip 7 can actually contact the inner surface of the inner frame 2 and prevent ingress of foreign objects into the interior of the bearing and seal.

In the embodiment shown in FIG. 7, the axial lip 7 is also formed with an expansion structure 7a that readily allows it to deform by expanding outwards in the radial direction. In a natural state before assembly and before contact with the inner frame 2, an expansion angle $\gamma$ of the expansion structure 7a is in the range 7-25 degrees. Such an expansion structure helps to reduce contact stress between the axial lip 7 and the inner frame 2, and thereby further reduce generation of heat by friction. More importantly, the expansion structure 7a itself forms a heat-dissipating vent valve (thermal vent) structure, which can release heat that has accumulated inside the seal and bearing; this greatly facilitates reduction of the temperature rise.

It can be seen from the above description that although the seal of the present invention has been developed for a deep groove ball bearing in an central support bearing unit in a lorry rear wheel drive system, it is in fact also suitable for various other conventional types of roller bearing. In fact, the seal of the present invention can be disposed on two sides of any conventional type of roller bearing (regular type rolling bearing), in the width direction between the inner and outer rings thereof, as long as the bearing provides an inner ring and an outer ring distributed in sequence from inside to outside in a radial direction, as well as at least one row of roller bodies disposed between the inner ring and outer ring. These conventional types of roller bearing include (but are not limited to) deep groove ball bearings, tapered roller bearings, angular contact ball bearings (angular contact bearings), self-aligning ball bearings, spherical ball bearings and CARB® toroidal roller bearings, etc.

On the basis of the above applications, the present invention is suitable for intermediate support bearing assemblies of various vehicle drive shafts. These bearing assemblies provide the deep groove ball bearing 10 employing the seal 1 of the present invention, the bearing housing 20 for fixing the deep groove ball bearing, the shock-absorbing material 30 disposed around the bearing housing, the framework 40 disposed around the shock-absorbing material, and the fastening means (not shown) for fixing the framework to the vehicle body.

Those skilled in the art should appreciate that any changes and improvements to the seal described above shall fall within the scope of protection of the present invention, as long as they conform to the definitions in the attached claims.

The invention claimed is:

1. A bearing seal, comprising:
an inner frame capable of securely positioning on a bearing inner ring after assembly, the inner frame having an inner surface comprising an axially extending radial inner surface and a radially extending axial inner surface, and
an outer frame capable of securely positioning on a bearing outer ring after assembly, the inner frame and outer frame being adjacent to each other after assembly, the outer frame having an axially extending portion and a radially extending portion, the radially extending portion including a distal end which faces and is the radially closest portion of the outer frame to the axially extending radial inner surface of the inner frame, wherein the outer frame being formed with a sealing body having an axial lip and a radial lip, the axial lip extending in an axial direction to abut the radially extending axial inner surface of the inner frame and the radial lip extending in a radial direction to abut the axially extending radial surface of the inner frame, for sealing an axial gap and a radial gap, respectively, between the inner frame and outer frame, the axial lip and the radial lip combining with the inner frame to form an airtight space configured to store lubricant, and wherein a flexible convolute structure is formed on the radial lip, and in a natural unrestricted state before assembly, the convolute structure is initially formed with first and second bent hinge points, the first and second hinge points each being a point of connection and intersection between adjacent bend surfaces in the convolute structure, being the locations of the principal regions where the material actually deforms by bending between adjacent bend surfaces such that a first V-shaped portion and a second V-shaped portion is formed in the seal body, and a first predetermined bend angle ($\beta$) is defined by the first V-shaped portion, and a second predetermined bend angle ($\alpha$) is formed by the second V-shaped portion, the first V-shaped portion opening in a first direction facing away from the airtight space, the second V-shaped portion opening in a second direction facing toward the airtight space, the first V-shaped portion being located between the distal end of the outer shield and the second V-shaped portion.

2. The bearing seal according to claim 1, wherein the convolute structure is formed with the first hinge point and the second hinge point in sequence substantially in a radial direction, and in the natural unrestricted state before assembly, the first predetermined bend angle ($\beta$) between adjacent bend surfaces at the first hinge point is 60-90 degrees, and the second predetermined bend angle ($\alpha$) between adjacent bend surfaces at the second hinge point is 35-60 degrees.

3. The bearing seal according to claim 1, wherein the axial lip is formed with an expansion structure that readily allows it to deform by expanding outwards in the radial direction, and in the natural unrestricted state before assembly, an expansion angle (y) of the expansion structure is in the range 7-25 degrees.

4. The bearing seal according to claim 1, wherein the sealing body, the axial lip and the radial lip are formed integrally from a rubber material or low friction rubber material.

5. The bearing seal according to claim 1, wherein the sealing body is formed on the outer frame, and the axial lip and radial lip serving as extensions thereof abut the inner surface of the inner frame.

6. The bearing seal according to claim 5, wherein a lip lubricant is stored in the airtight space defined by the axial lip, the radial lip and the inner frame.

7. A roller bearing, comprising:
an inner ring,
an outer ring distributed in sequence from inside to outside in a radial direction,
at least one row of roller bodies disposed between the inner ring and outer ring, the roller bodies being able to run by rolling between the inner and outer rings, wherein the bearing employs the seal of claim 1.

8. The roller bearing according to claim 7, wherein the bearing is a deep groove ball bearing, tapered roller bearing, angular contact ball bearing, self-aligning ball bearing, spherical ball bearing or CARB toroidal roller bearing.

9. A central support bearing unit for a drive shaft in a vehicle rear wheel drive system, comprising:
a deep groove ball bearing, employing the seal of claim 1,
a bearing housing for fixing the deep groove ball bearing,
a shock-absorbing material disposed around a periphery of the bearing housing, and
a framework disposed around a periphery of the shock-absorbing material.

* * * * *